UNITED STATES PATENT OFFICE.

OSCAR BALLY AND RICHARD METZGER, OF MANNHEIM, GERMANY, ASSIGNORS TO BADISCHE ANILIN & SODA FABRIK OF LUDWIGSHAFEN-ON-THE-RHINE, GERMANY, A CORPORATION OF BADEN

PRODUCING VAT DYES.

1,204,639.     Specification of Letters Patent.     Patented Nov. 14, 1916.

No Drawing.     Application filed December 4, 1913. Serial No. 804,714.

*To all whom it may concern:*

Be it known that we, OSCAR BALLY and RICHARD METZGER, citizens, respectively, of the Swiss Republic and the German Empire, residing at Mannheim, Germany, have invented new and useful Improvements in Producing Vat Dyes, of which the following is a specification.

In the specification of application for patent Serial No. 784,811 one of us has described the production of new vat dyes by introducing a radical into an amino group of an amino derivative of a dibenzanthrone, such radicals including, for instance, an alkyl, aryl, aralkyl, aldehyde, or acid radical, or the like. We have now found that when aldehydic radicals are to be introduced into the said amino groups the introduction can often be advantageously carried out by acting with an aldehyde on a leuco compound of the amino-dibenzanthrone or by employing the amino-dibenzanthrone itself in the present of a reducing agent. We regard it as equivalent to employ the corresponding nitro-dibenzanthrones in the presence of a reducing agent, since in this case the nitro group is reduced to the amino group and consequently the leuco compound of an amino-dibenzanthrone is produced, on which the aldehyde reacts. According to this invention aldehyde hydrosulfites and aldehyde sulfoxylates are particularly suitable for employment because being reducing agents on the one hand and aldehyde supplying agents on the other hand, and further if, during the reaction, alkali be employed, the mixture or solution produced can, if desired, be used directly for dyeing and printing. The process of this reaction can also be carried out on nitro- or amino-dibenzanthrone compounds which have already beeen applied to the fiber.

As specific instances of compounds which can be treated according to our invention, we mention amino-dibenzanthrone, amino-isodibenzanthrone, amino-dibenzanthrone-quinolin, and nitro-dibenzanthrone.

As instances, the amino and nitro- dibenzanthrones are amino- or nitro derivatives respectively of the compound, the structural formula of which probably is as follows:

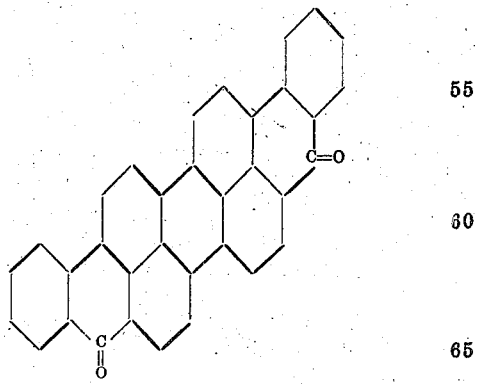

The following examples will serve to illustrate further the manner in which our invention can be carried into practical effect, but the invention is not confined to these examples. The parts are by weight.

Example 1: Boil together for from 3 to 4 hours a solution of 4 parts of sodium formaldehyde sulfoxylate and 10 parts of nitrodibenzanthrone (known in commerce as indanthrene green B paste and obtainable according to the specification of Patent No. 796,393). Pass air through the solution obtained until the coloring matter is precipitated, then filter it off and press it. It dyes cotton maroon.

Example 2: Mix together 500 parts of hot water, 6 parts of 35% caustic soda solution, 2.5 parts of nitro-dibenzanthrone and 1 part of sodium formaldehyde sulfoxylate. Then introduce the material which is to be dyed, boil for about 20 minutes, add another part of sodium formaldehyde sulfoxylate and boil for a further 20 minutes. In this way fast maroon shades are obtained.

Example 3: Prepare a printing paste from 20 parts of nitro-dibenzanthrone, 4 parts of calcined soda, 5 parts of glycerin, 63 parts of alkaline thickening (prepared from equal parts of British gum and a 20% sodium carbonate solution) and 8 parts of sodium formaldehyde sulfoxylate. Print this paste on to the material, dry, steam for 4 minutes, and then wash and soap at the boil. On treating the material with dilute hypochlorite solution, the deep maroon shades are converted into clear maroon.

Example 4: Boil, for about 30 minutes, material which has been dyed with aminodibenzanthrone, in a solution containing 4 parts of calcined soda and 2 parts of sodium formaldehyde sulfoxylate in about 1,000 parts of water. Then add another 2 parts of sodium formaldehyde sulfoxylate and boil for a further 30 minutes. Instead of sodium formaldehyde sulfoxylate, other compounds containing a reducing agent and an aldehyde can be employed, or mixtures of these compounds, such for instance as hydrosulfite, together with formaldehyde or benzaldehyde, or the like, can be used. The reaction can be carried out at varying temperatures, either above or below the normal boiling point, or even in the cold.

Similar methods may be employed when using other coloring matters of the hereinbefore mentioned type.

Now what we claim is:—

1. The process of producing vat dyes of the anthraquinone series by reacting with an aldehyde on a leuco compound of an amino derivative of a dibenzanthrone.

2. The process of producing a vat dye of the anthraquinone series by reacting with an aldehyde on an amino derivative of a dibenzanthrone in the presence of a reducing agent.

3. The process of producing a vat dye of the anthraquinone series by reacting with an aldehyde on a nitro derivative of a dibenzanthrone in the presence of a reducing agent.

4. The process of producing a vat dye of the anthraquinone series by reacting with a compound capable of splitting off an aldehyde on a leuco compound of an amino derivative of dibenzanthrone.

5. The process of producing a vat dye of the anthraquinone series by reacting on an amino derivative of a dibenzanthrone with a compound capable of splitting off an aldehyde and acting as a reducing agent.

6. The process of producing a vat dye of the anthraquinone series by reacting on a nitro derivative of a dibenzanthrone with a compound capable of splitting off an aldehyde and acting as a reducing agent.

7. The process of producing a vat dye of the anthraquinone series by reacting with sodium formaldehyde sulfoxylate on a nitro derivative of a dibenzanthrone.

8. The process of producing a vat dye of the anthraquinone series by reacting with sodium formaldehyde sulfoxylate on nitro dibenzanthrone.

9. The process of producing a vat dye of the anthraquinone series on the fiber by reacting on nitro-dibenzanthrone with sodium formaldehyde and caustic soda solution in the presence of the fiber.

In testimony whereof we have hereunto set our hands in the presence of two subscribing witnesses.

OSCAR BALLY.
RICHARD METZGER.

Witnesses:
J. ALEC. LLOYD,
S. S. BERGER.